United States Patent
Greene

(10) Patent No.: US 7,126,496 B2
(45) Date of Patent: Oct. 24, 2006

(54) TACTILE CUEING SYSTEM AND METHOD FOR AIDING A HELICOPTER PILOT IN MAKING LANDINGS

(75) Inventor: Randall A. Greene, White Plains, NY (US)

(73) Assignee: Safe Flight Instrument Corporation, White Plains, NY (US)

(*) Notice: Subject to any disclaimer, the term of this patent is extended or adjusted under 35 U.S.C. 154(b) by 202 days.

(21) Appl. No.: 10/953,607

(22) Filed: Sep. 30, 2004

(65) Prior Publication Data
US 2006/0071817 A1 Apr. 6, 2006

(51) Int. Cl.
*G08B 21/00* (2006.01)
(52) U.S. Cl. ............ 340/946; 340/407.1; 340/435; 340/965; 73/178 H; 73/178 T
(58) Field of Classification Search ............ 340/407.1
See application file for complete search history.

(56) References Cited

U.S. PATENT DOCUMENTS

| | | |
|---|---|---|
| 2,566,409 A | 9/1951 | Greene |
| 4,115,755 A | 9/1978 | Cotton |
| 4,195,802 A | 4/1980 | Gilson et al. |
| 4,551,723 A | 11/1985 | Paterson |
| 4,695,013 A | 9/1987 | Trampnau |
| 4,728,951 A | 3/1988 | Johnson et al. |
| 4,769,645 A | 9/1988 | Paterson |
| 5,986,582 A | 11/1999 | Greene et al. |
| 6,002,348 A | 12/1999 | Greene et al. |
| 6,002,349 A | 12/1999 | Greene et al. |
| 6,043,759 A | 3/2000 | Paterson et al. |
| 6,608,568 B1 * | 8/2003 | Ruchti ................. 340/946 |
| 2005/0151672 A1 * | 7/2005 | Augustin et al. ......... 340/965 |
| 2005/0225456 A1 * | 10/2005 | Greene ................. 340/965 |

* cited by examiner

*Primary Examiner*—Daniel Wu
*Assistant Examiner*—George Bugg
(74) *Attorney, Agent, or Firm*—Lowe Hauptman & Berner, LLP

(57) ABSTRACT

A tactile warning system for warning a helicopter pilot of a pre-selected altitude during a landing maneuver includes a collective control arm for control of the aircraft and a tactile warning device operatively connected to the collective control arm. The system includes a radio altimeter for sensing the actual altitude, a computer and keyboard for inputting a pre-selected height above the ground into the computer memory. A signal generator generates a signal indicative of the actual altitude as the aircraft approaches the ground. Then, when the actual altitude is equal to or less then the pre-selected altitude the system activates the tactile device. The warning system indicative of reaching a pre-selected height is also combined with a tactile warning system for avoiding "hot starts" and for avoiding other dangerous conditions.

17 Claims, 4 Drawing Sheets

TACTILE CUEING SYSTEM AND METHOD FOR AIDING A HELICOPTER PILOT IN MAKING LANDINGS

FIELD OF THE INVENTION

This invention relates to a tactile warning system for warning a helicopter pilot of the altitude of the helicopter as the aircraft approaches the ground during a landing maneuver and to a method for aiding a helicopter pilot in making a soft landing.

BACKGROUND FOR THE INVENTION

Devices for shaking the control column or "stick" which controls fixed wing aircraft are well known and provide an unmistakable warning of an impending stall. Such devices are typically mounted on the aircraft's control column or "stick" and provide a high amplitude low frequency vibration to signal the pilot of an impending stall. Such signals provide an unmistakable warning to the pilot, which cannot be confused with other warnings and signals typically present in an aircraft cockpit. Control column shakers of various designs are manufactured and sold by Safe Flight Instrument Corporation of White Plains, N.Y., the assignee of the present invention.

The use of a control column shaker in rotary wing aircraft is also known, as evidenced by U.S. Pat. No. 4,115,755 to Cotton. As disclosed therein, an alarm such as a shaking of the collective pitch control lever of a helicopter, is used as an indication that the actual acceleration exceeds the permissible acceleration. As disclosed by Cotton, the structural envelope of the helicopter, as defined by weight, air speed, rotor RPM, air density and collective stick position, is used as an indication of permissible loading of the helicopter rotor. Cotton also teaches the use of a gross measure of the aircraft weight, density of the air, air speed, collective pitch and rotor speed of the aircraft as an indication of a table lookup to determine the maximum permissible aircraft acceleration under such flight conditions, which is then compared against the actual aircraft acceleration to determine when the aircraft is maneuvered close to a loading which exceeds the structural envelope.

A helicopter anti torque limit warning device is disclosed in my U.S. Pat. No. 6,002,349. As disclosed therein, the pilot warning system acts on foot pedals which are operatively connected to the controllable force mechanism, with the pedal movement controlling the amount of force exerted by the controllable force mechanism on the tail boom to control the orientation of the helicopter fuselage about the yaw axis. A position sensing device senses the location of at least one of the foot pedals between its first and second positions, and a warning indicator operatively connected to the position sensing device provides a warning to the pilot when the sensed foot pedal reaches a pre-determined distance from one of the first and second positions. The warning indicator provides a tactile warning to the pilot, such as vibration or shaking of the respective foot pedal to provide an unmistakable warning to the pilot that the foot pedal has reached a pre-determined position near its maximum travel position. By such a warning system, the pilot is provided with a tactile input indicating that the helicopter yaw control system is approaching its maximum counter-rotating torque and that the pilot should take appropriate action.

A helicopter tactile exceedance or over stressed warning system for avoiding "hot starts" and other unsafe operating conditions is disclosed in my co-pending application Ser. No. 10/821,974 filed on Apr. 12, 2004 and assigned to the same assignee as the present invention. The system disclosed therein includes a tactile warning device attached to a control stick. A computer or micro processor and a keyboard for entering a safe temperature profile are also provided as well as a thermocouple for measuring the turbine output temperature. The computer compares the actual temperature versus the safe temperature profile and generates a signal to activate the tactile warning device when the actual temperature falls outside of the safe temperature profile to warn a pilot to abort the start. The tactile warning device is also activated during flight operations when an over stressed condition occurs to thereby warn the pilot to take corrective action. In addition, the tactile warning may be activated at a first frequency as an early warning and then at a second frequency as an indication of imminent danger.

While the aforementioned systems provide warnings under certain conditions, they do not address a particular problem associated with helicopter landings. For example, under various conditions, it can be difficult for a pilot to judge the distance from the ground during the final stages of a landing. To be more specific, it can be difficult to judge the distance from the surface of a body of water, to judge the distance from the ground during night operations and for landing in the desert or in other dusty conditions. Further, the difficulty in judging distance can be particularly difficult during the last 6 to 20 feet of altitude.

Accordingly, it is presently believed that there may be a relatively large commercial market for a tactile warning system for warning a helicopter pilot that the aircraft is at a pre-selected altitude and for aiding the pilot in making soft landings. It is also believed that there should be a relatively large commercial market for such systems which are highly reliable and yet relatively inexpensive to manufacture and install. In addition, the systems in accordance with the present invention are of minimal weight and size, easy to install and service, durable and at the same time provide a clear warning to the pilot that the aircraft is relatively close to the ground. The systems in accordance with a preferred embodiment of the invention also includes a tactile warning device that increases in intensity as the aircraft gets closer to the ground to enable a pilot to routinely make soft landings under adverse conditions.

BRIEF SUMMARY OF THE INVENTION

In essence, the present invention contemplates a tactile warning system for warning a helicopter pilot of the altitude of the helicopter as the helicopter approaches the ground during a landing maneuver. The system includes a collective control arm and pitch adjustment mechanism for control of the helicopter and a tactile warning device such as a stick shaker mechanism operatively connected to the collective control arm. Data storage means and means for inputting a pre-selected altitude or distance from the ground into the data storage means are also provided. The system also includes an altimeter such as a radio or radar altimeter for sensing the distance between the helicopter and the ground and a signal generator for generating a signal as the helicopter approaches the ground and comes within the pre-selected distance from the ground. The tactile warning device is activated by a signal from the signal generator to vibrate the collective control arm as a warning to the pilot that the helicopter is within the pre-selected distance from the ground.

In one embodiment of the invention the system includes means for increasing the frequency of vibration as the aircraft gets closer to the ground.

The invention also contemplates a method for aiding a helicopter in making a soft landing. The method also includes the steps of providing a collective control arm and a tactile warning device operatively connected to the control arm or stick. The method includes the steps of selecting a threshold altitude i.e., a pre-selected distance from the ground and sensing the actual altitude of the helicopter as it descends for a landing. In this embodiment of the invention the tactile warning is actuated as the helicopter reaches the threshold height to warn the pilot that the helicopter is within a given distance from the ground.

The present invention also contemplates a further embodiment of the invention i.e., a tactile warning system for warning a helicopter pilot of dangerous conditions. The system includes a collective control arm and pitch adjustment means for control of the helicopter and a tactile warning device operatively connected to the collective control arm. In this embodiment of the invention means are provided for activating the tactile warning device during a startup of a turbine engine when the turbine output temperature exceeds a pre-selected temperature. Means are also provided for activating the tactile warning device during flight operations to warn a pilot of dangerous conditions. Further, means are provided for activating the tactile warning device during an approach for landing when the helicopter reaches a pre-selected altitude.

The invention will now be described in connection with the accompanying drawings.

DESCRIPTION OF THE PREFERRED EMBODIMENTS OF THE INVENTION

Figure 1:
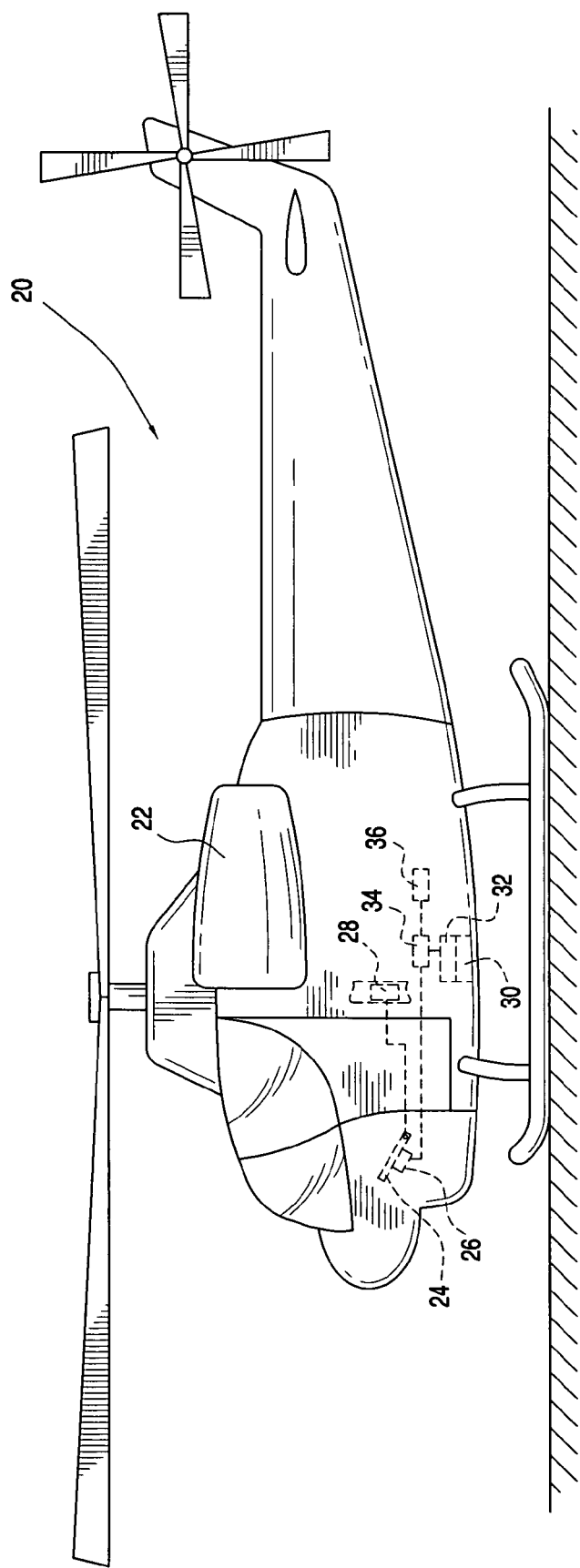
FIG. 1 is a side elevational view of a helicopter which includes a tactile warning system in accordance with the present invention.

As shown in FIG. 1, a tactile warning system for warning a helicopter pilot of a pre-selected altitude of the aircraft as for example, 10, 12, 15 and 20 feet above the ground or surface of water during a landing is disposed in a helicopter 20. As illustrated, the helicopter 20 includes a turbine engine 22, a collective 24 and a tactile warning device 26 attached thereto. The collective 24 or collective control arm is operably connected to a pitch adjustment mechanism 28 for control of the helicopter in a conventional manner.

The tactile warning system also includes data storage means such as a computer 34 and input means 36 for inputting or entering a pre-selected altitude into the computer. As shown in FIG. 1, the tactile warning system also includes an altimeter 30 such as a radio or radar altimeter for sensing the actual altitude of the helicopter and a signal generator 32 which may be incorporated in the altimeter 30 for generating a signal response to the actual altitude of the helicopter 20. The computer 34 includes data storage means and is connected to the input means 36 such as a keyboard of the like in a conventional manner. The input means is used for entering a pre-selected altitude, for example, 10', 15' or 20 above the terrain.

As used in a preferred embodiment of the invention, a radio or radar altimeter of the type used by serious IFR pilots is used to provide absolute assurance of accurate height above the ground. The altimeter which is of conventional design includes an antenna which may be mounted under the fuselage of the helicopter and a receiver/transmitter. The core of such devices is a single frequency radar system that broadcast a pulsed tone directly downward. The time that it takes for the reflected tone to be received directly translates into the height above the terrain. Thus, the better the receiver/transmitter the more accurate the readings.

The signal generator 32 sends a signal indicative of the actual altitude of the aircraft to the computer 34 which in turn activates the tactile warning device 26 when the actual altitude is less then the pre-selected altitude or threshold height. The tactile warning device then vibrates the collective 24 to warn a pilot that the helicopter has reached the pre-selected altitude.

Figure 2:
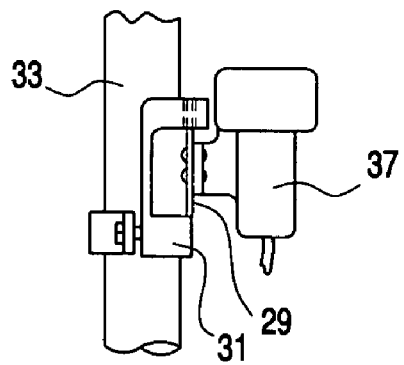
FIG. 2 is a schematic illustration of a helicopter collective having a tactile warning device attached thereto.

The tactile warning device or stick shaker is of a conventional design, but may take the form of a stick shaker as shown in FIG. 2. As shown therein a shaker 36 is attached to a leaf spring 29 which in turn is attached at one end to a clamp 31. The clamp 31 attaches the shaker 36 to a collective control arm 33.

Figure 3:
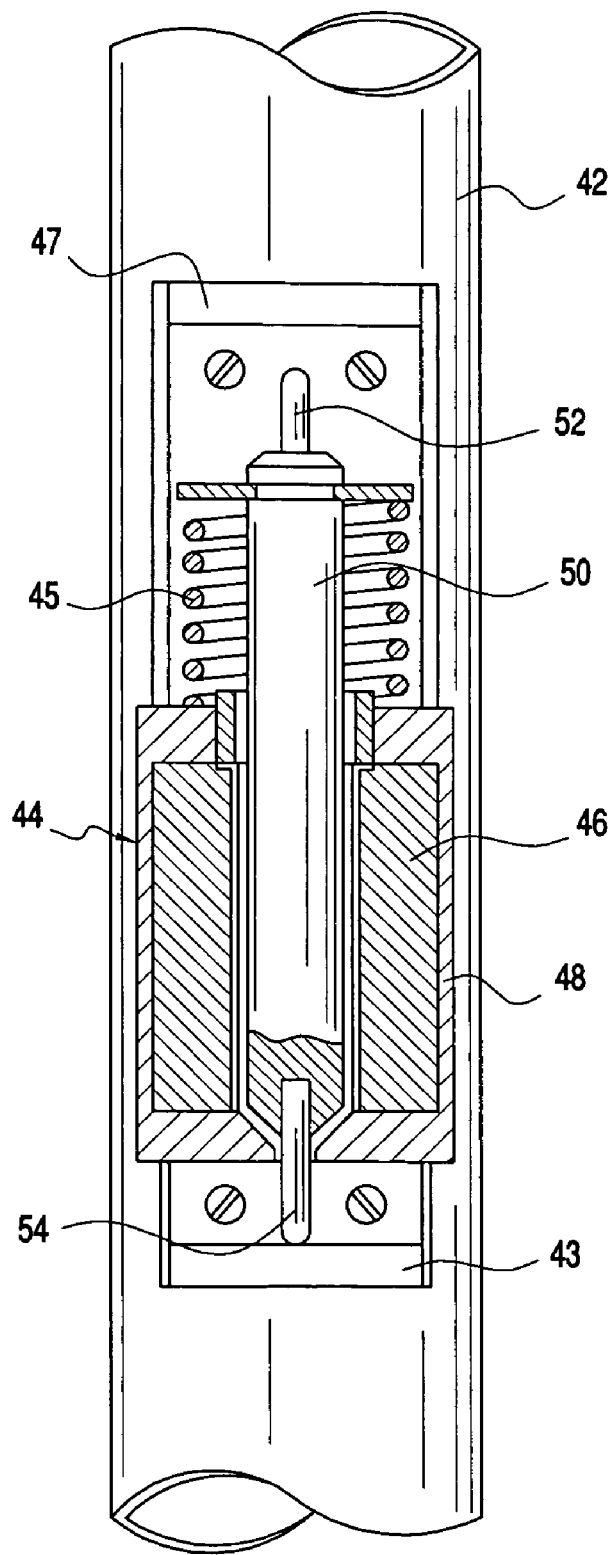
FIG. 3 is a cross sectional view of a stick shaker mechanism for use in the present invention.

FIG. 3 illustrates an alternative mechanism as used in a tactile warning system in accordance with the present invention. As shown therein, a helicopter collective control arm 42 used in the control of the collective pitch of a helicopter includes a reciprocating shaker mechanism 44 mounted on an arm 52 such as on the top thereof. The shaker mechanism may be bolted to the top of the arm 52, held thereon by threaded fasteners (not shown) or attached in any conventional manner.

The reciprocating mechanism 44 comprises an alternating solenoid which includes a solenoid coil 46, magnetic circuit 48 and plunger 50. Strikers 52 and 54 are disposed on each end of the plunger 10 and are adapted to strike end plates 43 and 46. As the plunger moves back and forth with the solenoid coil 46. The plunger 50 which is shown in its energized position is biased in the opposite direction by a coil spring 45 so that the striker 52 will strike the end stop 46 when the solenoid is de-energized.

Figure 4:
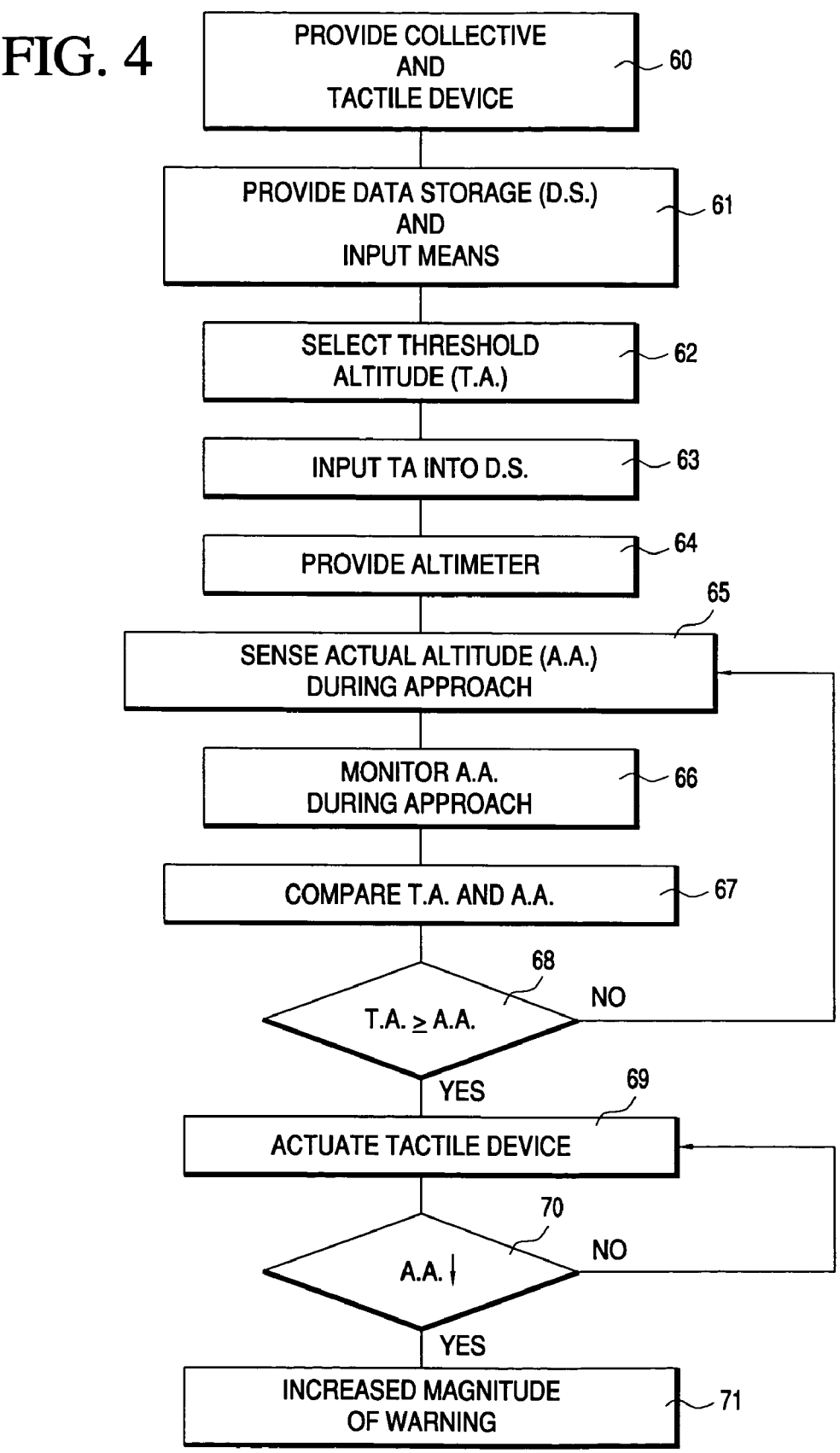
FIG. 4 is a block diagram which illustrates one embodiment of the invention.

FIG. 4 is a block diagram which illustrates the use of the tactile warning system and method in accordance with one embodiment of the present invention. As shown therein, a collective control arm and tactile warning device are provided in step 60 as well as a data storage means or computer and input means such as a keyboard in step 61. In step 62 and 63 a pre-selected altitude such as 6, 10, 12, 15 or 20 feet above the terrain is selected and entered into the data storage means. The system also incorporates a radio or radar altimeter which is provided in step 64.

During a landing maneuver or approach to a landing the actual altitude is sensed in step 65, monitored in step 66 and the threshold altitude and actual altitude are compared in step 67 as for example by a computer. Then, as indicated at 68 when the threshold altitude is equal to or greater then the actual altitude, the tactile warning device is actuated in step 69 to provide an unmistakable warning that the aircraft is within a pre-selected distance from the ground. However, if the threshold altitude is less then the actual altitude the system recycles to step 65 and the actual altitude is monitored in step 66.

In a preferred embodiment of the invention the actual altitude is continuously monitored after reaching the threshold level and if the actual altitude decreases below the threshold level as indicated at 70, the magnitude of the warning is increased in step 71.

Figure 5:
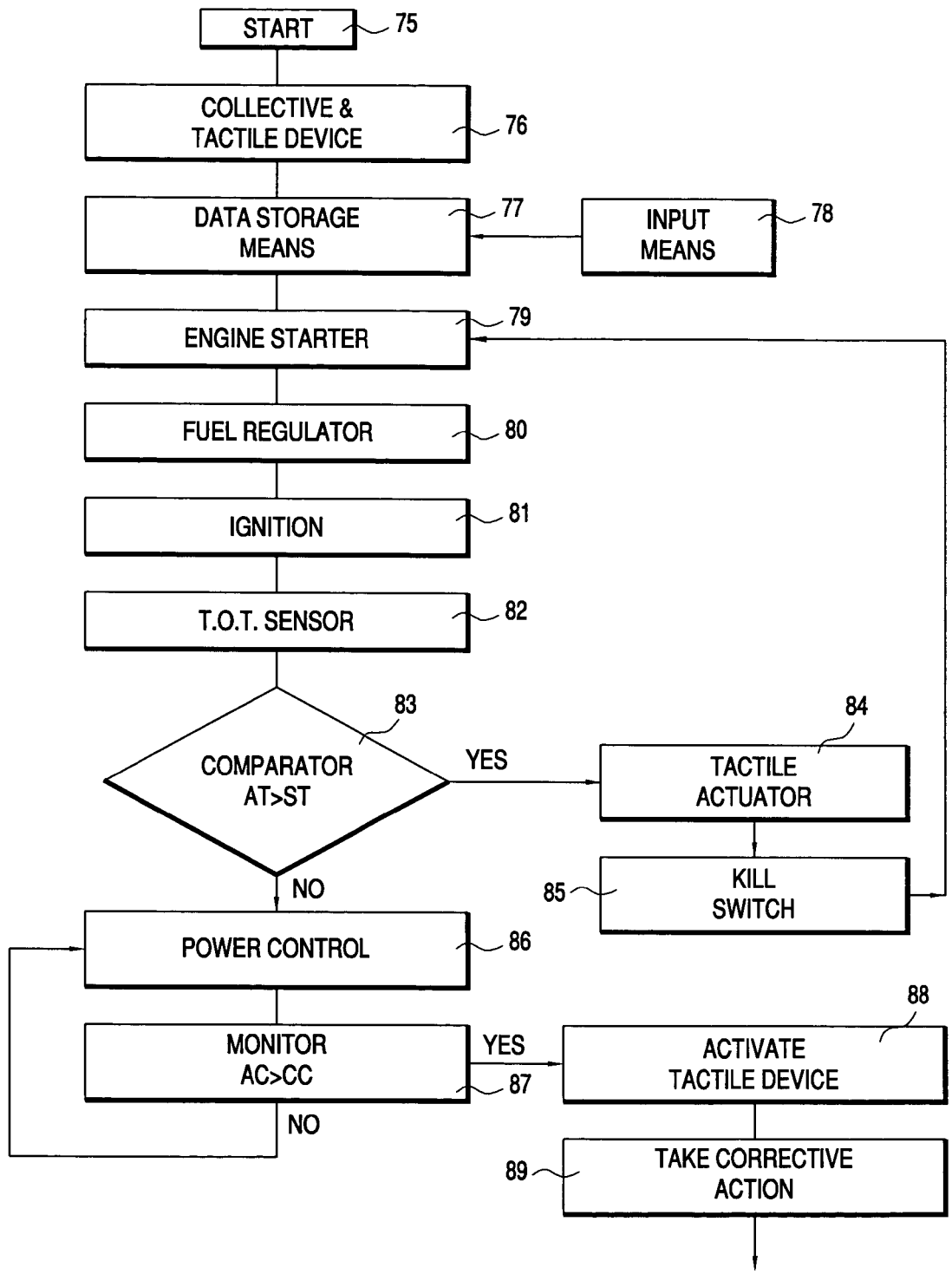
FIG. 5 is a block diagram which illustrates another embodiment of the invention.

A further embodiment of the invention is illustrated in FIG. 5 which combines the system and method of FIG. 4 with a system for avoiding "hot starts" and other unsafe operating conditions as disclosed and claimed in my aforementioned co-pending application Ser. No. 10/821,974 which is incorporated herein in its entirety by reference. In this way, the tactile device, data storage means and input device serves a dual function to warn a pilot of overheating during startup, and subsequently aiding the pilot in making a soft landing.

As illustrated in FIG. 5, a startup 75 of a turbine powered helicopter is initiated as provided in an FAA approved procedure. However, before initiating a startup procedure, a tactile device is attached to a collective control arm in step 76 and a data storage means, device or computer and an input means are provided in step 77 and 78. In this embodiment of the invention, a safe temperature or safe temperature profile is inputted into the data storage means and an engine starter motor activated in step 79. The fuel delivered to the engine is regulated in step 80. In step 81 the fuel is ignited and the turbine output temperature is sensed in step 82. A computer compares the actual temperature (A.T.) with the stored temperature i.e., safe starting temperature (S.T.) or safe temperature profile in step 83. Then, if the actual temperature exceeds the safe startup temperature or falls outside of the safe temperature profile, the tactile warning device is actuated in step 84 and the engine is shut down in step 85. Then, after a suitable length of time or mechanical inspection, the system is cycled back to step 79. However, if in step 83 the actual temperature does not exceed the safe temperature or falls outside of the safe temperature profile, the engine is started and the power of the engine is controlled in step 86 in a conventional manner.

In a further embodiment of the invention, actual conditions are continuously monitored and compared with pre-selected critical conditions during operation of the aircraft in step 87. Then, when the actual conditions exceed the critical conditions during flight operations the tactile device is actuated in step 88 and the pilot takes corrective action in step 89.

Further, as the helicopter pilot approaches a landing the system as illustrated in FIG. 4 begins with step 62 to thereby provide a tactile warning during startup, during flight operations and in aiding a pilot in making a soft landing.

While the invention has been described in connection with its preferred embodiments, it should be recognized that changes a modifications may be made therein without departing from the scope the appended claims.

The invention claimed is:

1. A tactile warning system for warning a helicopter pilot of the altitude of the helicopter as the helicopter approaches the ground, said system comprising:
   a collective control arm and pitch adjustment mechanism for control of a helicopter;
   an altimeter for sensing the distance between the helicopter and the ground;
   data storage means and means for inputting a pre-selected altitude into said data storage means;
   signal generating means for generating a signal as the helicopter approaches the ground and comes within a pre-selected distance from the ground; and
   a tactile warning device operably connected to said collective control arm and responsive to a signal from said signal generator means for vibrating said collective control arm as a warning to the pilot that the helicopter is within the pre-selected distance from the ground.

2. A tactile warning system for warning a helicopter pilot of the altitude of the helicopter as the helicopter approaches the ground according to claim 1 in which the altimeter is a radio altimeter.

3. A tactile warning system for warning a helicopter pilot of the altitude of the helicopter as the helicopter approaches the ground in accordance with claim 1, and wherein the tactile warning device vibrates the collective control arm and wherein the frequency of vibration increases as the helicopter gets closer to the ground.

4. A tactile warning system for warning a helicopter pilot of the altitude of the helicopter as the helicopter approaches the ground in accordance with claim 1 and wherein the tactile warning device increases the amplitude of vibration of the collective control arm as the helicopter draws nearer to the ground.

5. A tactile warning system for warning a helicopter pilot of the altitude of the helicopter as the helicopter approaches the ground in accordance with claim 1 and wherein the tactile warning system includes an eccentrically mounted weight and electric motor for rotating said eccentrically mounted weight about an axis whereby the inertial rotation of the unbalanced weight produces vibration in the collective control arm.

6. A tactile warning system for warning a helicopter pilot of the altitude of the helicopter as the helicopter approaches the ground in accordance with claim 1 and which includes means for increasing the rotational speed of the eccentrically mounted weight as the helicopter comes closer to the ground.

7. A tactile warning system for warning a helicopter pilot of the altitude of the helicopter as the helicopter approaches the ground in accordance with claim 1 and wherein the tactile warning system includes a reciprocal weight operably connected to said collective control arm and means including an electric motor and electric means for reciprocating said weight to thereby vibrate said collective control arm.

8. A tactile warning system for warning a helicopter pilot of the altitude of the helicopter as the helicopter approaches the ground in accordance with claim 1 and which includes means for actuating said tactile warning device in response to a dangerous condition during startup and/or in flight operation.

9. A method for aiding a helicopter pilot in making a soft landing comprising the steps of:
   providing a collective and a tactile warning device operably connected to the collective;
   selecting a threshold height for warning a pilot of a pre-selected distance to the ground during a landing operation;
   sensing the altitude of the helicopter as it descends for a landing; and activating the tactile warning device as the helicopter reaches the threshold height to warn the pilot of the distance to the ground.

10. A method for aiding a helicopter pilot in making a soft landing in accordance with claim 9 which includes the step of increasing the magnitude of the tactile warning as the helicopter closes the distance between the threshold height and the ground.

11. A method for aiding a helicopter in making a soft landing comprising the steps of:

providing a collective pitch adjusting mechanism and a moveable collective control arm operatively connected to the collective pitch adjusting mechanism whereby movement of the collective control arm collectively adjusts the pitch of the motor blades;

providing a storage device and an input device;

selecting a threshold height for warning a pilot of a preselected distance from the ground and entering the threshold height into the storage device;

providing an altimeter and monitoring the actual altitude of the helicopter as the helicopter approaches the ground for landing;

providing a computer for comparing the sensed altitude and the threshold height and comparing the sensed altitude and the threshold height; and actuating the tactile warning device when the actual height is equal to or less than the threshold height to warn the pilot of the distance to the ground.

12. A method for aiding a helicopter pilot in making a soft landing in accordance with claim 11 and which includes the step of increasing the magnitude of the tactile warning as the helicopter approaches the ground.

13. A method for aiding a helicopter pilot in making a soft landing in accordance with claim 12 wherein the tactile warning device is a striker shaker.

14. A method for protecting a helicopter of the type having a turbine engine during startup and/or aiding a pilot in making a soft landing comprising the steps of:

providing a pilots control stick and tactile warning device operatively connected to the central stick;

providing a safe temperature profile for startup of the helicopter turbine engine;

monitoring an actual turbine output temperature of the engine during startup;

activating the tactile warning device when the actual turbine output temperature exceeds the safe temperature profile and aborting the startup in response to the tactile warning; and selecting a threshold height for warning a pilot of a pre-selected distance to the ground during a landing maneuver;

sensing the altitude of the helicopter as it descends for a landing; and activating the taotile warning device as the helicopter reaches the threshold height to warn the pilot of the distance to the ground.

15. A tactile warning system for warning a helicopter pilot of dangerous conditions, said system comprising:

a collective control arm and pitch adjustment mechanism for control of the helicopter;

a tactile warning device operably connected to said collective control arm;

means for actuating said tactile warning device during a startup when the engine temperature exceeds a pre-selected temperature;

means for actuating said tactile warning device during flight operation to warn a pilot of dangerous conditions; and means for actuating said tactile warning device during a landing approach.

16. A tactile warning system for warning a helicopter of dangerous conditions according to claim 15 which includes the step of increasing the magnitude of the tactile warning when a danger becomes more imminent or the altitude decreases between a threshold distance from the ground.

17. A method for aiding a helicopter in making a safe landing according to claim 11 which includes the steps of selecting a second pre-selected altitude and vibrating the collective at a different frequency than a first frequency when the helicopter descends to the second pre-selected altitude.

* * * * *